March 25, 1969 F. W. ROHE 3,434,261
MOLDED-IN INSERT WITH FLOATING NUT
Original Filed March 30, 1964
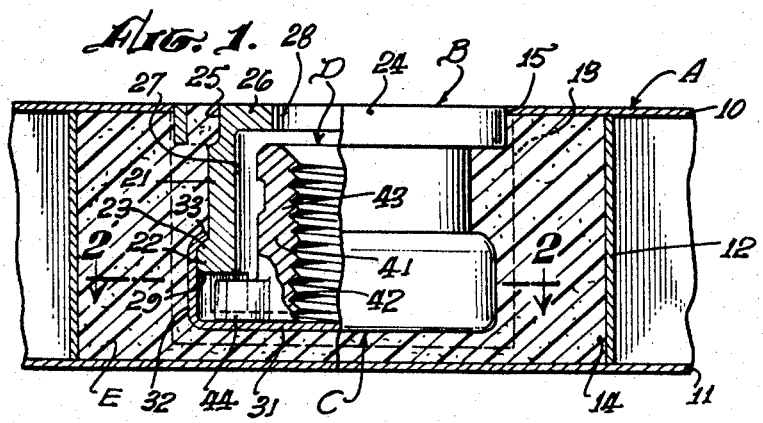
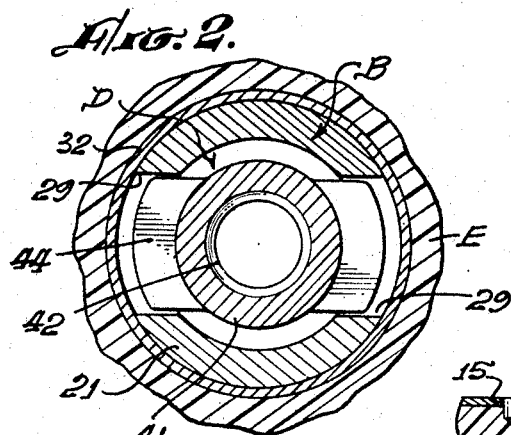
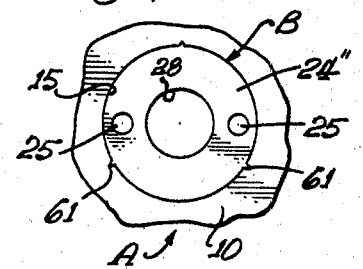
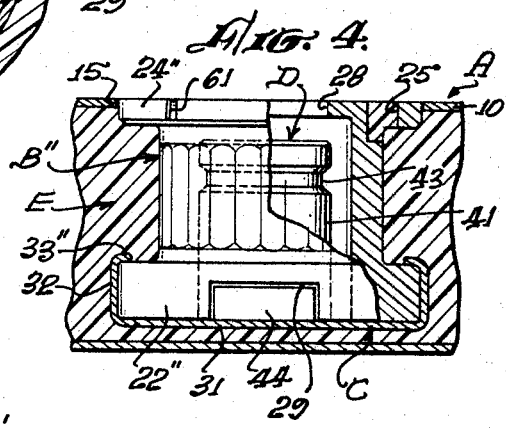
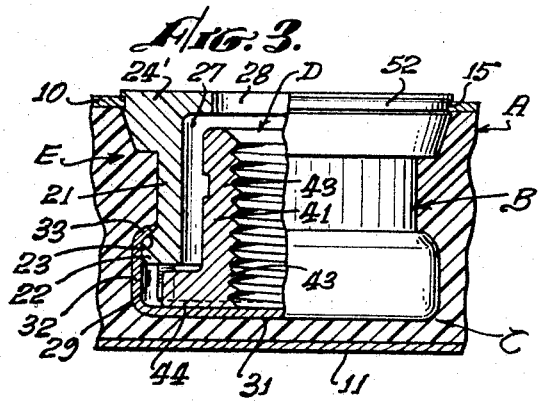
FREDERICK W. ROHE,
INVENTOR.
BY Lynn H Latta
ATTORNEY.

United States Patent Office 3,434,261
Patented Mar. 25, 1969

3,434,261
MOLDED-IN INSERT WITH FLOATING NUT
Frederick W. Rohe, Placentia, Calif.
(P.O. Box 1407, Santa Ana, Calif. 92702)
Original application Mar. 30, 1964, Ser. No. 355,809, now Patent No. 3,313,078, dated Apr. 11, 1967. Divided and this application Feb. 8, 1967, Ser. No. 638,675
Int. Cl. E04b *1/40;* E04c *2/38;* F16b *39/00*
U.S. Cl. 52—617        6 Claims

ABSTRACT OF THE DISCLOSURE

A fastener for installation in lightweight sandwich panels (e.g. with honeycomb core structure) anchorage being provided by embedding it in a body of solidified potting compound within a hole in the panel. The fastener comprises a tubular shell, a floating nut enclosed therein, and a cap closing the inner end of the shell and cooperating therewith to define a socket in which the nut is enclosed with limited clearance for self-aligning (floating) adjustment to a bolt inserted therein, while being held against rotation. Radially projecting keys (lugs) on opposite sides of the nut are received in diametrically opposite keyway notches in the inner end of the shell to provide the floating, torque-holding connection. The keys are retained in the notches by the closure cap. A head on the outer end of the shell is fitted in a circular aperture in the skin sheet at one side of the sandwich panel, to provide a closure for the potting hole in the panel. Flats or other non-circular external surfaces of the shell interlock with the potting body to lock the shell against rotation in the panel.

---

This application is a division of my application Ser. No. 355,809, filed Mar. 30, 1964, for Molded-In Insert With Floating Nut, now Patent No. 3,313,078, issued Apr. 11, 1967.

The prior art

Molded-in inserts for installation in lightweight sandwich panels have been extensively used in aircraft and other lightweight construction for many years, in a one-piece form comprising simply a nut of a suitably flanged external configuration for installation in a panel hole and closure of the outer end of the hole. Such inserts are disclosed in my Patents Nos. 2,880,830, 3,016,578, 3,217,363, 3,271,498, and British Patent No. 812,540 of 1959. More recently, molded inserts of floating nut construction such as the insert disclosed in my Patent No. 3,019,865 have been extensively used in many installations where limited self-alignment of the nut to the inserted bolt is required. Such inserts have included a nut with radially projecting keys socketed in recesses machined in enlarged diametrically opposite members of an inner head of the shell, such members including integral skirt portions closing the radially outer extremities of the key-socketing recesses, and a plain flat disc being employed to close the end areas of the recesses to provide closed pockets. Such construction, used commercially for several years, was of relatively high cost because of the routing type of machining required in producing the key-socket recesses in the shell. Accordingly, there existed a need for a less expensive construction, equally satisfactory in use. Die-casting the shell was not a satisfactory solution to the problem, partially because of limited strength of die-cast construction and partially because of limited market for the floating type insert and the high cost of die-casting tooling.

Summary of invention

The present invention provides a solution to the problem of reducing cost of fabricating floating-nut molded inserts in providing an improved shell structure wherein keyway notches are machined rapidly and inexpensively in the inner end of the shell by milling diametrically across such inner end to provide notches extending radially across the full thickness of the wall structure of said inner end. The resulting open outer ends of the keyway notches are closed by the rim of a cup-shaped end cap which closes the inner end of the shell. The head at the inner end of the shell is thereby sealed against entry of potting compound. The wall thickness of the sheet metal cap can be considerably less than that of the integral skirt portion of the earlier floating insert, the diameter of the inner head can be correspondingly less (thus reducing weight) and the keyway sockets can be deeper radially, for a selected maximum diameter of the inner head.

The rim of the closure cap is fitted snugly around the inner end of the shell, in close encirclement of a cylindrical periphery of a shallow annular flange providing a thickened inner end of the shell, and the edge of the cap rim is turned inwardly in clinching engagement with a shallow shoulder defined between such flange and the adjoining tubular body of the insert, thus providing a very secure attachment of the cap to the shell, obviating the necessity for welding, brazing or soldering the closure to the end of the shell, as was required in the insert of Patent No. 3,019,865. Such attachment also provides a well-sealed end closure for excluding the entry of potting compound into the nut socket within the shell.

With the foregoing in mind, the invention has as its general object to provide an improved molded-in insert of the floating nut type, of lightweight construction and reduced fabrication cost.

A specific object is to provide such an insert having a shell that can be fabricated rapidly and inexpensively by screw machine and milling operations and does not require the use of die casting or forging dies.

Another object is to provide such an insert having improved means for sealing the inner end of the shell to provide a closed nut-retaining chamber into which the potting compound or adhesive cannot penetrate during the molding in operation of installaing the insert in a panel.

Other objects and advantages will become apparent in the ensuing specification and appended drawings in which:

FIG. 1 is a sectional view, on an enlarged scale, of a section of sandwich panel with my improved insert fastener, partially in cross section, installed therein;

FIG. 2 is a cross sectional view thereof, taken on the line 2—2 of FIG. 1;

FIG. 3 is a sectional view of an installation embodying a modified form of the insert;

FIG. 4 is a sectional view of an installation embodying a further modified form of the invention;

FIG. 5 is a plan view of the insert installation shown in FIG. 4.

Detailed description

Referring now to the drawing in detail and in particular to FIGS. 1 and 2 thereof, I have shown therein, as an example of one form in which the invention may be embodied an insert adapted for installation in a lightweight sandwich panel A, said insert comprising, in general, a shell B having an outer end fitted into an opening in one of the skin sheets of sandwich panel A; a cap C of sheet material closing the inner end of the shell B and cooperating with the latter to define a socket; and a nut D which is anchored for floating, self-aligning movements within such socket. In the panel and insert installation, the hole 13 around the insert B–D, and the communicating pockets 14 are filled with a body of potting compound or adhesive E which is preferably of a solidified epoxy resin but can be of any equivalent adhesive or cement material.

Sandwich panel A is of a type comprising spaced skin sheets 10 and 11 attached to opposite sides of a lightweight core 12 which may consist of a honeycomb structure of thin ribbon material providing a series of honeycomb walls extending transversely between the skin sheets 10 and 11 and having the opposite edges of the ribbon material suitably secured to the inner faces of the skin sheets. In preparation for the installation of one of the inserts B–D, a hole 13 is drilled or lanced through the skin sheet 10 and through the lightweight core material 12, terminating at the inner face of the opposite skin sheet 11 or near the same, depending upon whether the insert has an axial length substantially equal to or somewhat less than the thickness of the panel A. Where the core material 12 is of the honeycomb wall structure referred to above, the hole 13 will cut through a number of honeycomb walls, leaving pockets 14 defined between the periphery of the hole 13 and the walls of core 12 radiating outwardly therefrom. The hole 13 has a mouth defined by an aperture 15 in the skin sheet A. Preferably this aperture is circular and the hole 13 is defined by cut edges of the core walls 12 in a cylindrical array.

Shell B comprises a cylindrical tubular body portion 21 having at its inner end a thickened cylindrical collar portion 22 projecting radially outwardly from body 21, with the cylindrical outer walls of these parts joined by an offset shoulder 23; and a head 24 in the form of a flat circular flange with a cylindrical periphery which is fitted closely in the skin sheet aperture 15 and provides a closure for the hole 13. Extending through the head 24, parallel to the wall of tubular body 21 and externally thereof, is a port 25 through which the potting compound E is injected in liquid form during the installation of the insert, in a process which may be approximately as described in my Patent No. 3,016,578, issued Jan. 16, 1962. A similar port is preferably provided at a diametrically opposite point in head 24, for the escape of air from the hole 13, ahead of the body of potting compound as it fills the hole.

Head 24 includes a radially inwardly projecting annular retainer lip 26 which overhangs the outer end of the nut D to retain the same in a socket 27 which is defined within the shell. The inner margin of lip 26 defines an aperture 28 for entry of a bolt into the shell B, for coupling to the nut D.

One or more keyway notches 29, extending radially through the thickened collar portion 22 of shell body 21 and communicating with the radial end face thereof, are provided in the shell B for rotation-limiting anchorage of the nut D to the shell.

End cap C is of formed sheet material such as stamped aluminum alloy sheet, with a suitable anodized or equivalent finish, comprising a flat bottom disc 31, a substantially cylindrical rim 32 and a reentrant lip 33 which is closed around the thickened collar portion 22 of shell B and locked against the offset shoulder 23 thereof. The bottom disc 31 may be engaged flatly against the radial end face of collar portion 22 as in FIG. 4, or slightly spaced therefrom as in FIG. 1.

Cap C completely closes the inner end of socket 27 so as to exclude the potting material E therefrom when it is being injected into the hole 13 in liquid form. Thus, only the outer end of the shell is open, at 28.

Nut D comprises a cylindrical tubular body 41, internally threaded at 42, a thread locking section 43 which may embody any known thread locking means; and a pair of radially projecting keys 44 at its inner end, loosely received in keyway notches 29 and coupling the nut D to the shell B in a floating condition such that the nut may have limited rotational and lateral translational movements with reference to the shell B for self-alignment with respect to a bolt inserted through aperture 28 and threaded into the nut. Also, in order that the nut may be free of any restriction upon said self-aligning movements, there is preferably provided a small amount of axial clearance between the keys 44 and the axial extremities of the keyways 29 as defined by the cap disc 31 and the axially opposed bottoms of the keyway notches respectively, as best shown in FIG. 1.

Within the shell B the socket 27 is defined by a counterbore which extends, full diameter, to the inner end of the shell and terminates at the lip 26. This makes it possible to fabricate the shell B as a screw-machine or automatic lathe product with the exception of the keyway notches 29, which can be milled in the inner end of the shell by a diametrical milling operation. Thus the expense of dies for die casting is avoided. The cap C is a simple stamping or molded part, with a plain cylindrical rim as it comes from the punch press or mold, and is installed by placing it over the collar 22 and turning the lip 33 inwardly in a suitable closing operation. The nut D can be fabricated as a screw machine product with a cylindrical flange which can later be reduced by a broaching operation to leave the keys 44 projecting radially from the cylindrical tubular body 41; or in the alternative it can be formed as a cold-headed or impact-extrusion part, with the internal thread 42 in either event being fabricated by conventional screw threading. In the aggregate, the novel features of construction embodied in the floating insert make it possible to reduce production costs substantially.

In the installation of the insert, the shell B is held by suitable holding means such as a holder on the injection gun, until the potting material E is sufficiently set to support the insert in the installed position.

In FIG. 3 there is shown an alternative means for holding the insert in position until the potting compound has hardened. Shell B′ has a head 24′ provided with a frusto-conical expander mandrel 51 adapted to be forced through the skin sheet aperture 15 and to expand the skin sheet at the margin of the aperture until, by contraction, it snaps into a shallow peripheral coupling groove 52 closely adjacent the outer surface of head 24′. In other respects the insert of FIG. 3 may be the same as that of FIG. 1 as indicated by the use of corresponding reference numerals to designate the same.

In FIG. 4 there is shown a further alternative means for positioning the insert during the hardening of the potting compound E, wherein the head 24″ of the shell B″ has a peripheral wall which is cylindrical except for one or more small projections 61 which are forced into the skin sheet 10 in the margin of aperture 15 in a preliminary step of installation in which the head 24″ is pressed into flush relationship with the outer face of the skin sheet 10. The projections 61 can be knife-like so as to readily cut into the margin of skin sheet 10 and are effective when embedded in the skin sheet to support the insert during the hardening of potting compound E. The initial step of positioning the insert in the opening 15 may be accomplished by attaching the insert to the nozzle of an injection gun for the potting compound and utilizing an anvil on such nozzle to establish the flush relationship with the skin sheet 10 as described more in detail in U.S. Patent No. 3,282,015. In other respects insert installation of FIG. 4 may be the same as in FIGS. 1, 2 as indicated by use of corresponding reference numerals, with the exception of collar 22″ at the inner end of the shell which may be in the form of a radial flange as shown, and the lip 33″ which may correspondingly project radially as shown.

Nut D has its tubular body 41 and head 72 loosely received within shell counterbore 27 and the socket of cap C, with adequate clearances for self-aligning movements.

I claim:

1. For installation in a lightweight sandwich panel having spaced skin sheets joined to opposite sides of a lightweight core in which there is provided a hole extending into said core from an opening in one of said skin sheets, a fastener insert comprising: a shell including a head proportioned to be fitted in said skin sheet opening and having a central aperture to receive a bolt, and a tubular body projecting axially from said head and having an open inner end provided with a radial keyway notch therein extending through the full wall thickness thereof; a cap of sheet material comprising an end disc covering the open end of said tubular body and the axial extremity of said notch, and a rim integral with said disc and encircling and secured to said tubular body adjacent said open end and closing the radially outer extremity of said keyway notch; and a nut having an internally threaded tubular body received within said shell and a key projecting radially from the inner end of said threaded body and loosely received in said keyway notch to limit rotation of said nut relative to said shell while permitting limited self-aligning movements thereof during installation of a bolt, said rim being fitted to the periphery of said tubular body.

2. A fastener insert wherein as defined in claim 1 there are two pairs of said keyways and keys disposed at diametrically opposite sides of the insert.

3. A fastener insert as defined in claim 1, wherein said open inner end of the shell is embodied in an integral, radially outwardly thickened open collar which is provided with said radial keyway notch therein extending through the full wall thickness thereof, said collar defining an annular shoulder merging with a thinner wall portion of said tubular body, said cylindrical cap rim encircling said collar and terminating in a reentrant lip engaging said shoulder to secure said cap to said collar with said end disc seated against the end of said tubular shell body.

4. An insert as defined in claim 1, wherein said shell head has a uniformly cylindrical periphery proportioned to be fitted snugly within said skin sheet aperture to function as a closure therefor, with its outer end face flush with the outer face of said one skin sheet and held in that position by the potting compound.

5. An insert as defined in claim 1, wherein said head has a shallow peripheral groove closely adjacent its outer face, proportioned to receive said skin sheet at the margin of said opening, and a frusto-conical expander mandrel projecting axially inwardly from said marginal groove and operative on said skin sheet at said opening margin to expand the same until it can snap into said annular groove, whereby said shell will be held in position in said hole during the hardening of the potting compound.

6. An insert fastener as defined in claim 1, wherein said head has a periphery provided with a plurality of small radial projections adapted, under axial pressure, to be embedded in said one skin sheet at the margin of said opening therein and to thereby secure said shell to said one skin sheet sufficiently to support the shell in position during the hardening of the potting compound.

References Cited

UNITED STATES PATENTS

| 1,192,804 | 7/1916 | Von Wolffradt | 52—708 X |
| 2,607,446 | 8/1952 | Rosan | 287—189.36 |
| 3,016,578 | 1/1962 | Rohe | 52—617 X |
| 3,019,865 | 2/1962 | Rohe | 52—617 |

FOREIGN PATENTS

| 812,540 | 4/1959 | Great Britain. |

ALFRED C. PERHAM, *Primary Examiner.*

U.S. Cl. X.R.

52—708; 151—41.7, 41.76